US011985964B2

(12) United States Patent
Lohmeier

(10) Patent No.: US 11,985,964 B2
(45) Date of Patent: May 21, 2024

(54) FISHING ROD HOLDER

(71) Applicant: Kevin F Lohmeier, Roscoe, IL (US)

(72) Inventor: Kevin F Lohmeier, Roscoe, IL (US)

( * ) Notice: Subject to any disclaimer, the term of this patent is extended or adjusted under 35 U.S.C. 154(b) by 540 days.

(21) Appl. No.: 16/526,048

(22) Filed: Jul. 30, 2019

(65) Prior Publication Data
US 2020/0037594 A1  Feb. 6, 2020

Related U.S. Application Data

(60) Provisional application No. 62/714,521, filed on Aug. 3, 2018.

(51) Int. Cl.
*A01K 97/10* (2006.01)
(52) U.S. Cl.
CPC .................. *A01K 97/10* (2013.01)
(58) Field of Classification Search
CPC ........ A01K 97/10; A01K 91/08; A01K 97/06; A01K 97/04; F41A 23/06; F41A 23/10; F41A 23/04; F41A 23/14; B63B 17/00; B25B 5/006; B25B 11/02; F16M 13/022; A01G 9/122; A01G 17/04; A01G 17/14
USPC .................................................. 43/21.2, 54.1
See application file for complete search history.

(56) References Cited

U.S. PATENT DOCUMENTS

| | | | | | |
|---|---|---|---|---|---|
| 3,772,816 | A | * | 11/1973 | Ridge | A01K 97/10 43/21.2 |
| 3,903,634 | A | * | 9/1975 | Miyamae | A01K 97/10 43/21.2 |
| 4,650,146 | A | * | 3/1987 | Duke | A01K 97/10 248/512 |
| 6,446,379 | B1 | * | 9/2002 | James | A01K 97/10 43/17 |
| 6,591,541 | B1 | * | 7/2003 | Cummings | A01K 97/10 248/514 |
| 9,179,657 | B1 | * | 11/2015 | Winter | A01K 87/00 |
| 2015/0151666 | A1 | * | 6/2015 | Stenger | B60P 7/135 224/401 |

FOREIGN PATENT DOCUMENTS

| | | | | |
|---|---|---|---|---|
| EP | 0914767 A1 | * | 5/1999 | ............. A01K 97/10 |
| EP | 1004239 A1 | * | 5/2000 | ............. A01K 97/10 |
| GB | 2366502 A | * | 3/2002 | ............. A01K 97/10 |

\* cited by examiner

*Primary Examiner* — Peter M Poon
*Assistant Examiner* — Jeffrey R Larsen
(74) *Attorney, Agent, or Firm* — John R. Ross; John R. Ross, III

(57) ABSTRACT

A fishing rod holder for holding a fishing rod. A base for the rod holder has a mounting interface. At least one forward pivot arm is pivotally connected to the base. At least one rear pivot arm is pivotally connected to the base. A forward rod support is connected to each forward pivot arm and a rear rod securing device is connected to each rear pivot arm. In a preferred embodiment the forward rod support includes two vertical bent prongs with each bent prong having locking indentions. A fishing line travel slot is also included to allow for free travel of the fishing line. Also, in a preferred embodiment the rear rod securing device includes a lower stationary arm rigidly connected to the rear pivot arm, an upper pivot arm pivotally connected to the lower stationary arm and a handle receiving indention. When securing the fishing rod, the fishing rod is compressed between the upper pivot arm and lower stationary arm and rests in the handle receiving indention.

11 Claims, 13 Drawing Sheets

FISHING ROD HOLDER

The present invention relates to fishing devices, and in particular, to fishing rod holders. This application claims the benefit of U.S. Provisional Application No. 60/714,521, filed Aug. 3, 2018.

BACKGROUND OF THE INVENTION

Fishing is a very popular pastime, recreational sport, and for many a career choice. It has been enjoyed around the world for countless generations. Fishermen commonly enjoy fishing from the shore, a pier or a boat. A fisherman may use one rod or more than one rod. He may hold the rod while fishing or set it down as appropriate. In this case the fisherman may utilize a fishing rod holder. There are currently fishing rod holders on the market for purchase and use. However, existing rod holders have not provided the proper design to allow for the quickest release possible while locking the rod securely in place.

What is needed is a better fishing rod holder.

SUMMARY OF THE INVENTION

The present invention provides a fishing rod holder for holding a fishing rod. A base for the rod holder has a mounting interface. At least one forward pivot arm is pivotally connected to the base. At least one rear pivot arm is pivotally connected to the base. A forward rod support is connected to each forward pivot arm and a rear rod securing device is connected to each rear pivot arm. In a preferred embodiment the forward rod support includes two vertical bent prongs with each bent prong having locking indentions. A fishing line travel slot is also included to allow for free travel of the fishing line. Also, in a preferred embodiment the rear rod securing device includes a lower stationary arm rigidly connected to the rear pivot arm, an upper pivot arm pivotally connected to the lower stationary arm and a handle receiving indention. When securing the fishing rod, the fishing rod is compressed between the upper pivot arm and lower stationary arm and rests in the handle receiving indention.

DETAILED DESCRIPTION OF THE PREFERRED EMBODIMENTS

Figure 1A:
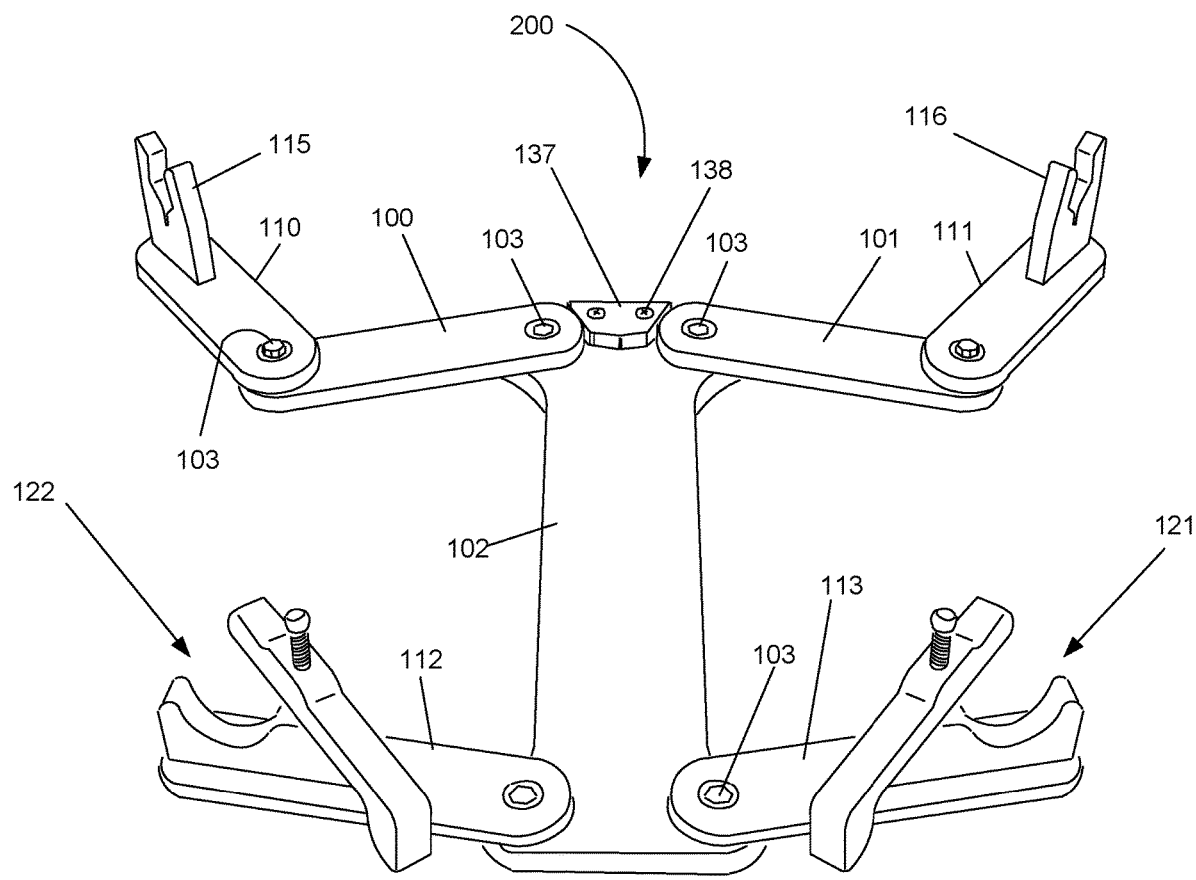
FIGS. 1-2 show a preferred embodiment of the present invention.
Figure 1B:
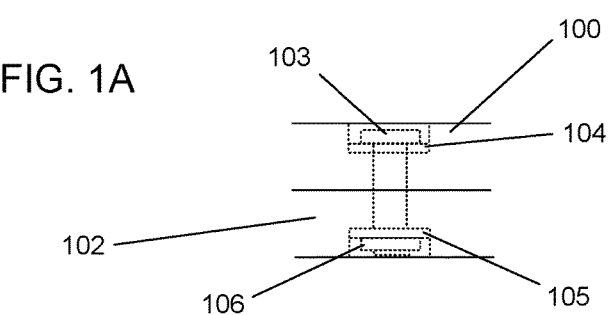
Figure 2:
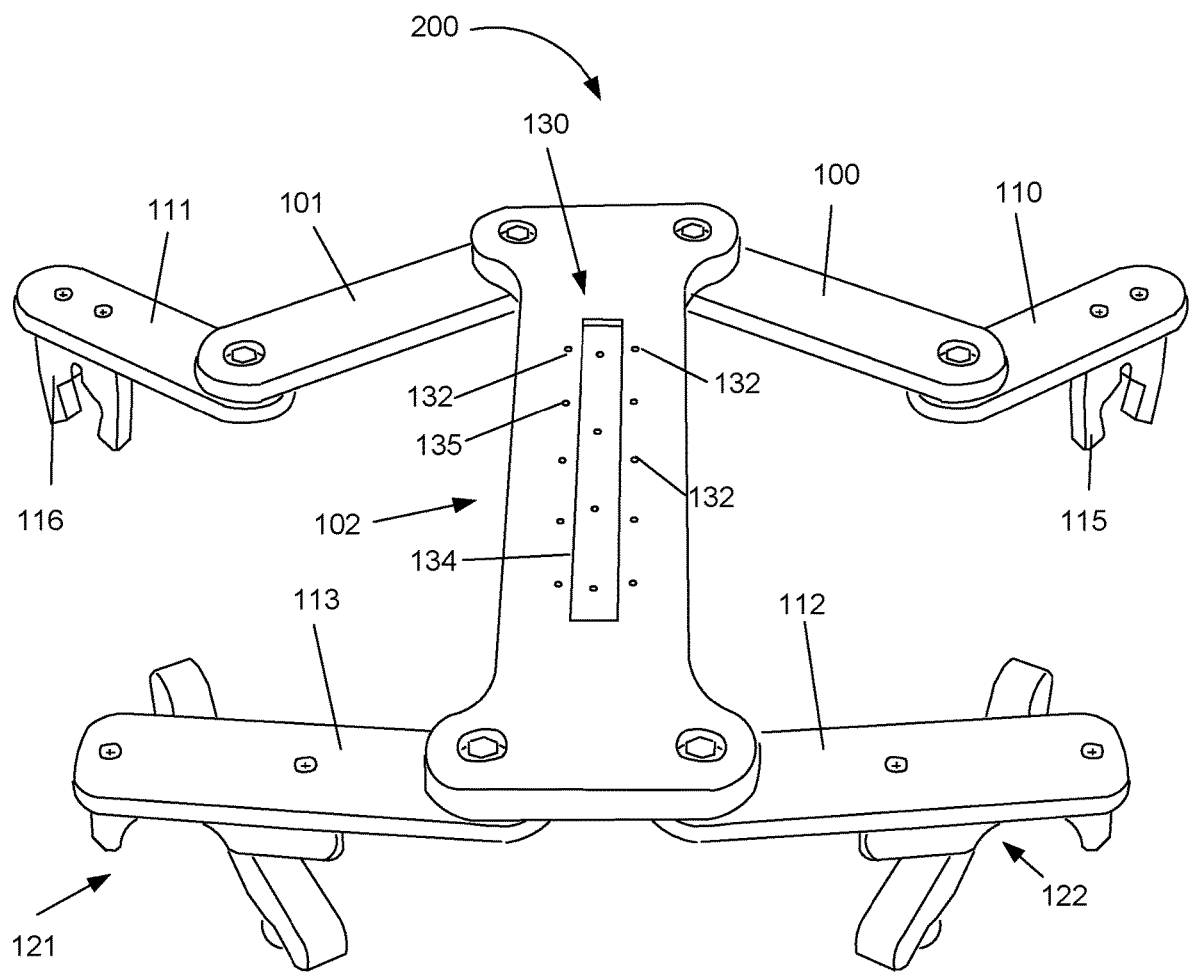

FIG. 1 shows a top perspective view and FIG. 2 shows a bottom perspective view of a preferred embodiment fishing rod holder 200. In a preferred embodiment, fishing rod holder 200 is fabricated from hard plastic.

Forward inner pivot arms 100 and 101 are pivotally connected to base 102 and may be pivoted easily by a user. Once pivoted to a preferred position the pivot arms are held in place via friction force between the pivot arms and base 102. FIG. 1B shows details of the pivot connection. Bolt 103 extends through washer 104, pivot arm 100, base 102, washer 105, and is secured by nut 106. In a preferred embodiment, nut 106 is tightened loosely enough to allow pivoting motion between pivot arm 100 and base 102, but tight enough so that pivot arm 100 once properly positioned will remain in the proper position due to friction force until once again pivoted by a user. Pivot arms 100, 101, 110, 111, 112 and 113 are preferably each pivoted and held in position via friction force in a similar fashion. Forward pivot arm motion stopping piece 137 is rigidly connected to base 102 via screws 138 and functions to prevent undesired pivot motion of pivot arms 100 and 101.

Forward outer pivot arm 110 is pivotally connected to pivot arm 100. Forward rod support 115 is rigidly connected to pivot arm 110, as shown. Likewise, forward outer pivot arm 111 is pivotally connected to pivot arm 101. Forward rod support 116 is rigidly connected to outer pivot arm 111.

Rear pivot arm 113 is pivotally connected to base 102. Rear rod securing device 121 is rigidly connected to pivot arm 113. Likewise, rear pivot arm 112 is pivotally connected to base 102. Rear rod securing device 122 is rigidly connected to pivot arm 112.

Mounting interface 130 is shown in FIG. 2. In a preferred embodiment, mounting interface 130 includes mounting holes 132 drilled into base 102. Mounting interface 130 also includes recessed mounting slot 134 with mounting holes 135.

Figure 3:
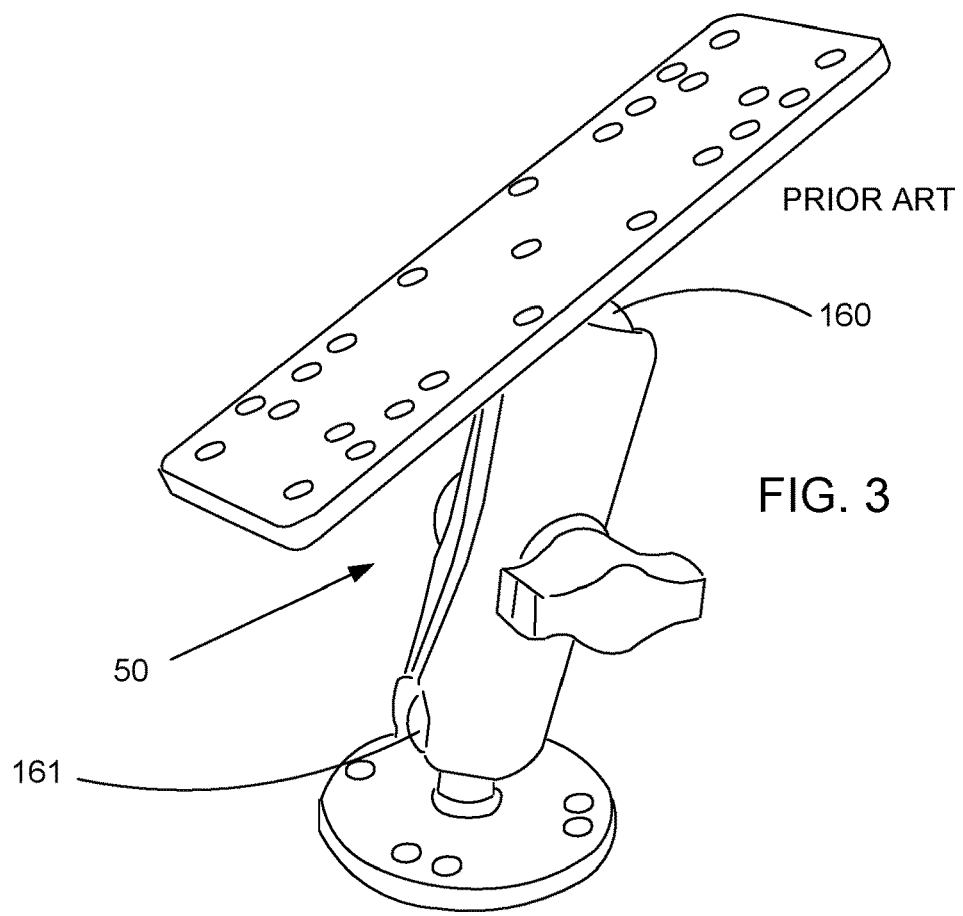
FIG. 3 shows a prior art mount.

Fishing rod holder 200 may be rigidly mounted on a secure surface by utilization of mounting interface 130. Preferred surfaces for mounting include a boat (such as a fishing boat or kayak) or a fishing pier. An example of preferred mount 50 is shown in FIG. 3. Mount 50 is a RAM® mount. RAM® is a registered trademark of National Products, Inc. and refers in general to:

universal mounting linkages comprising a base and gasket, a ball and arm with socket, bolts, springs, washers and threaded tightening knob, made primarily of metal, to be used with a variety of custom components to mount a wide variety of items from electronic devices to fishing rod holders.

Figure 4:
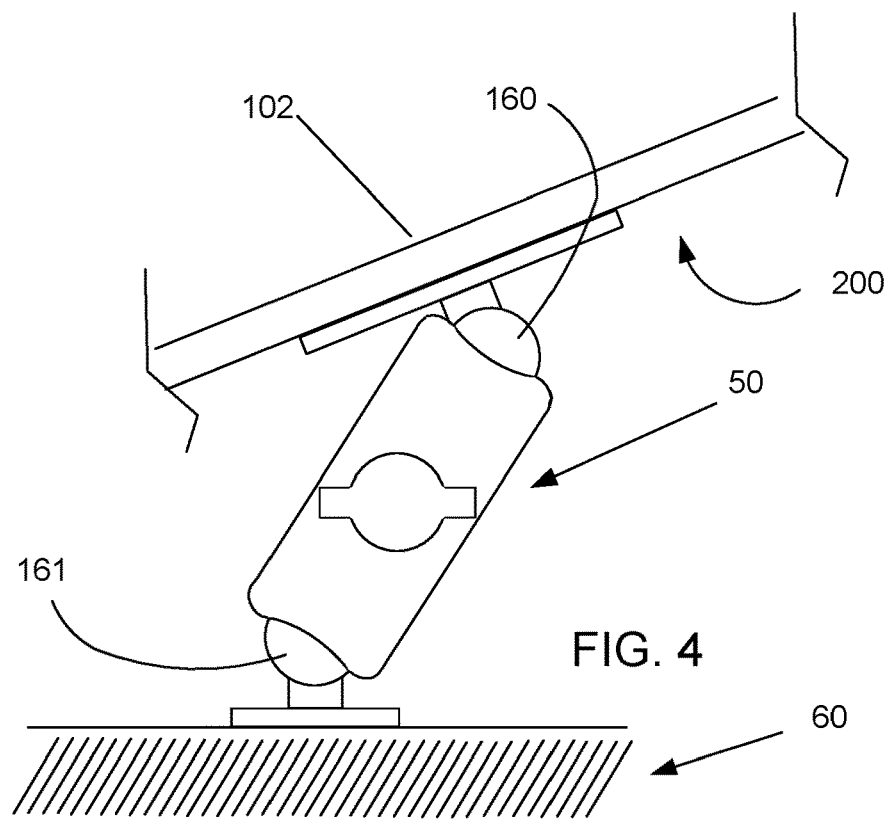
FIG. 4 shows a preferred embodiment of the present invention mounted to a boat surface.

In FIG. 4, base 102 is mounted to mount 50 by utilization of mounting holes 132 of mounting section 130. Mount 50 is rigidly mounted to boat surface 60. Fishing rod holder may be pivoted and positioned in any position preferred by the user by utilization of dual ball and socket connections 160 and 161 of mount 50.

Figure 5:
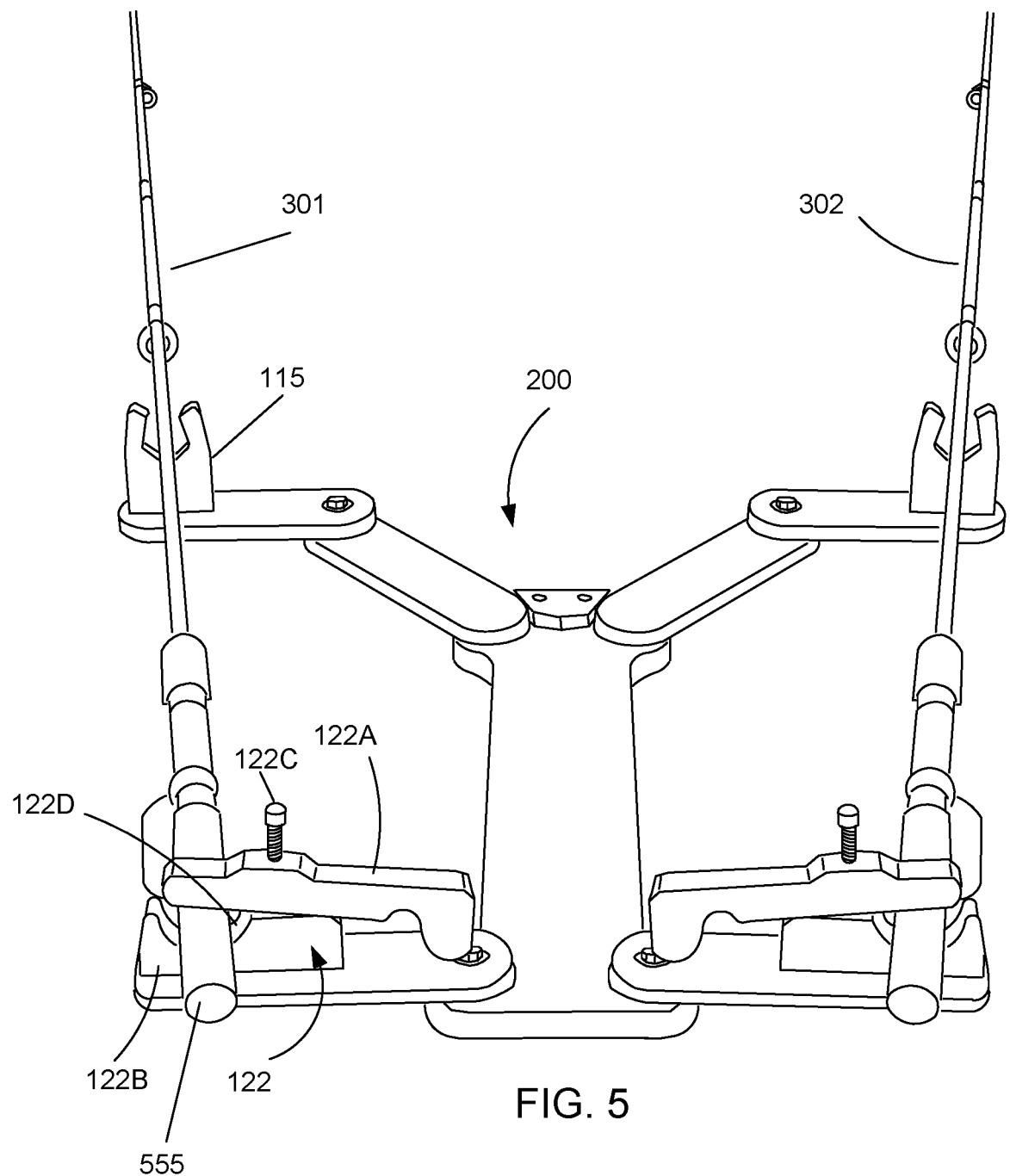
FIGS. 5-10 show utilization of a preferred embodiment of the present invention.
Figure 8:
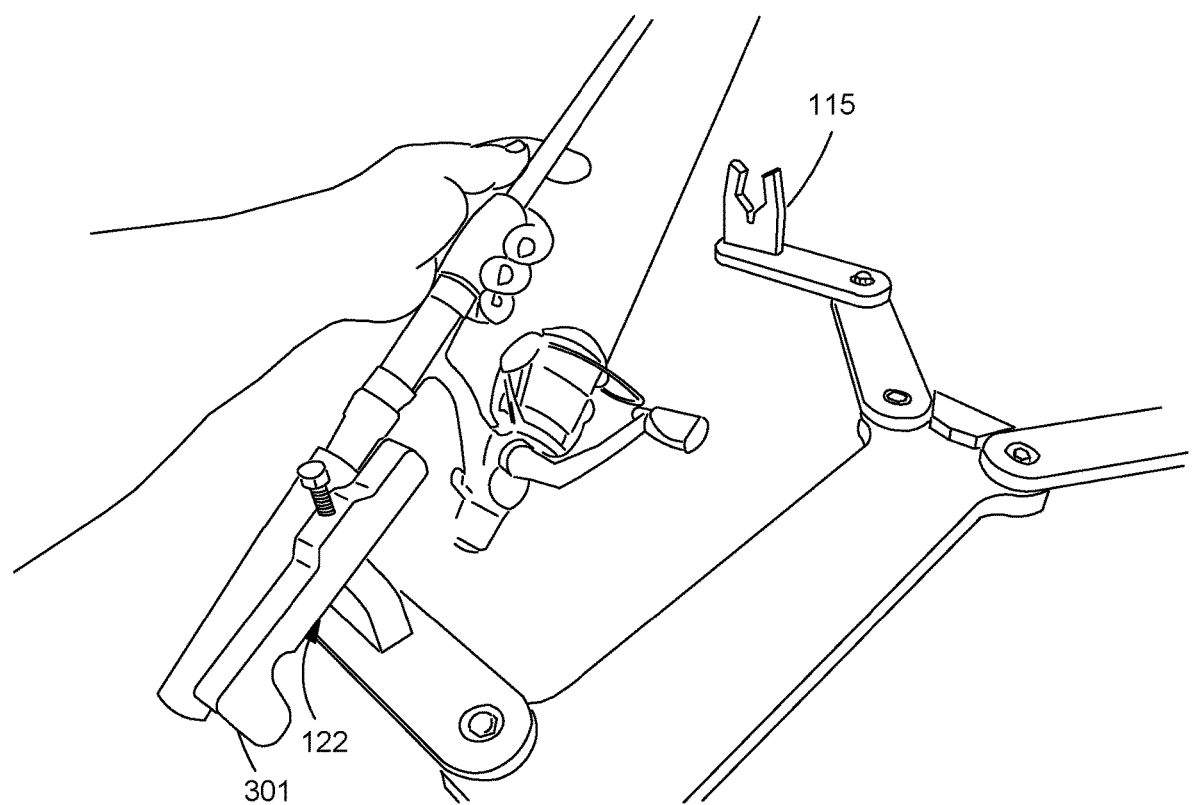

In FIG. 5, a user has placed fishing rods 301 and 302 into fishing rod holder 200 as shown. Fishing rod 301 is secured tightly in place by rear rod securing device 122. Upper pivot arm 122A compresses rod 301 between upper pivot arm 122A and lower stationary arm 122B to hold handle 555 of rod 301 firmly in place. Upper pivot arm 122A rotates about bolt 122C. Handle 555 is compressed and rests in handle receiving indention 122D. The forward portion of rod 301 is supported by forward rod support 115. This is an ideal position for fishing in that the user may now leave rod 301 unattended in confidence knowing that the rod is secure by function of rear rod securing device 122 and also knowing the rod can quickly be retrieved from fishing rod holder 200 merely by picking the rod up and releasing rear rod securing device 122. For example, in FIG. 8 the user has lifted up on rod 301. It pulls easily up from forward rod support 115. If the user wishes he can easily now pull it clear from rear rod securing device 121. It should be noted that in FIG. 5 rod 302 is likewise secured in a fashion similar to rod 301, as shown.

Figure 6:
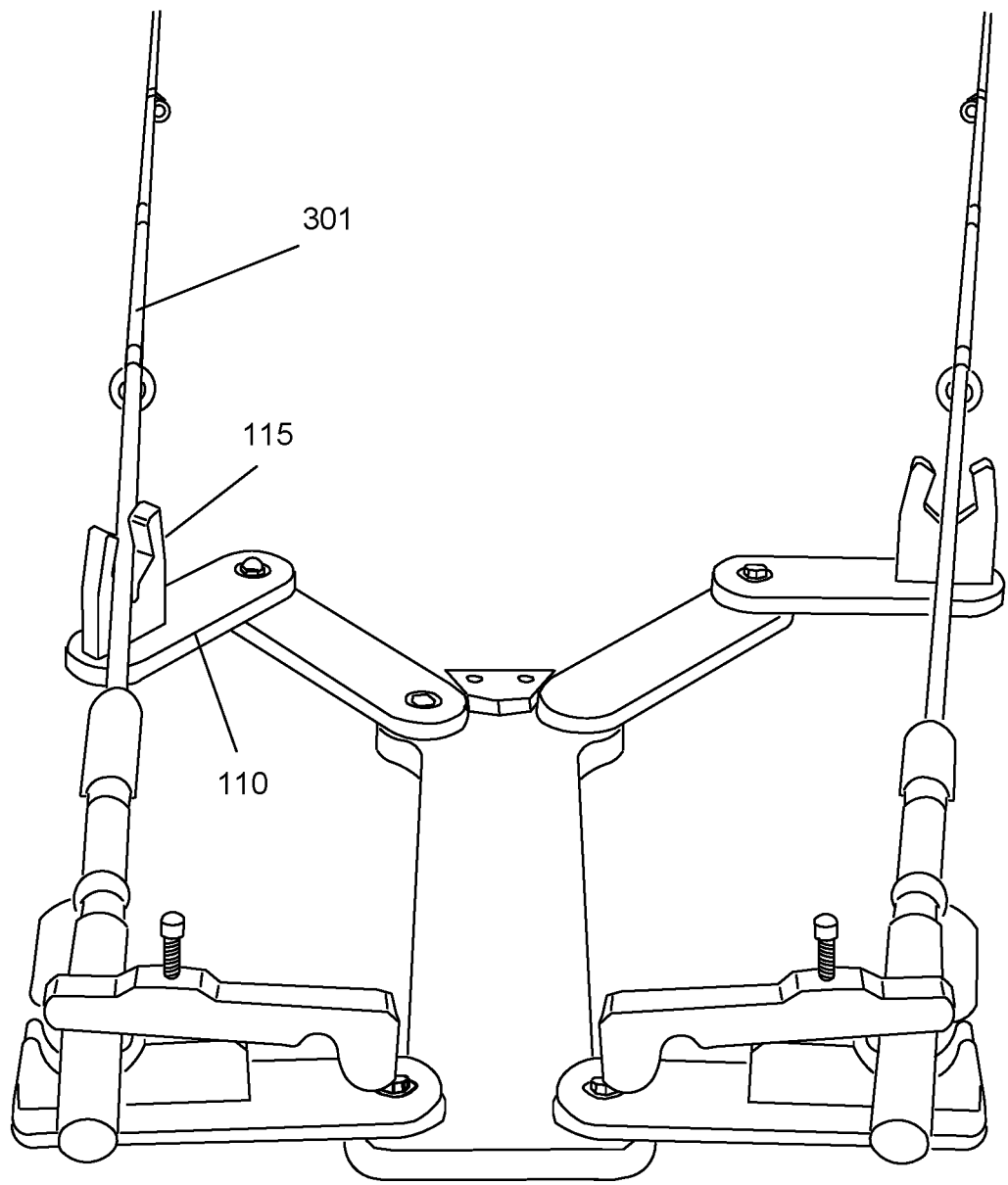

In FIG. 6, the user has pivoted arm 110 counterclockwise so that forward rod support 115 has locked the forward section of rod 301 as shown. This action has further secured the rod in place so that even a powerful fish cannot pull it out.

Figure 7:
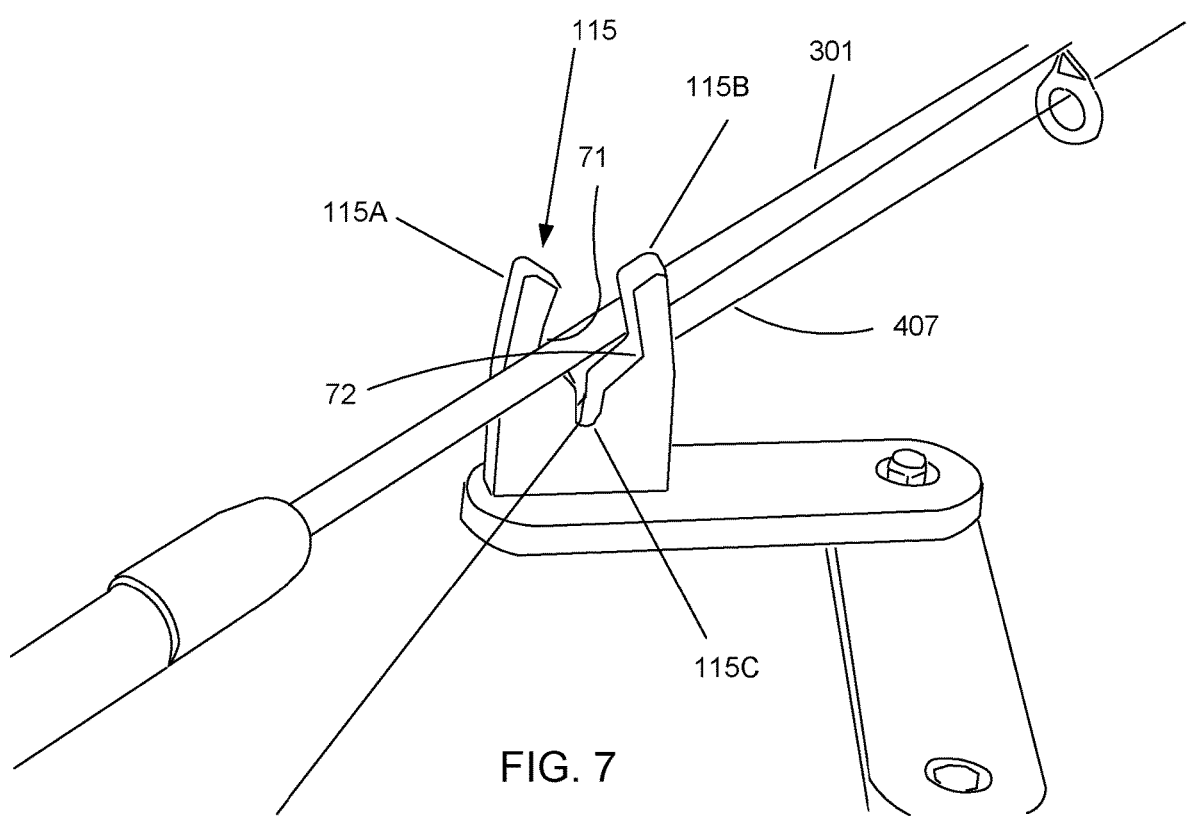

FIG. 7 shows in greater detail the locking mode of forward rod support 115. In a preferred embodiment, forward rod support 115 includes vertical oppositely opposed bent prongs 115A and 115B. Forward rod support 115 also includes fishing line travel slot 115C. Vertical prong 115A includes locking indentation 71 and vertical prong 115B includes locking indentation 72. Indentations 71 and 72 allow for horizontal motion of rod 301 and also aid in locking the forward part of rod 301 in place when forward rod support 115 is pivoted into locking mode. For example, In FIG. 7 rod 301 is pinched between indentations 71 and 72, thereby locking it in place. Even while locked in place, fishing line 407 is free to travel through fish line travel slot 115C.

Figure 14:
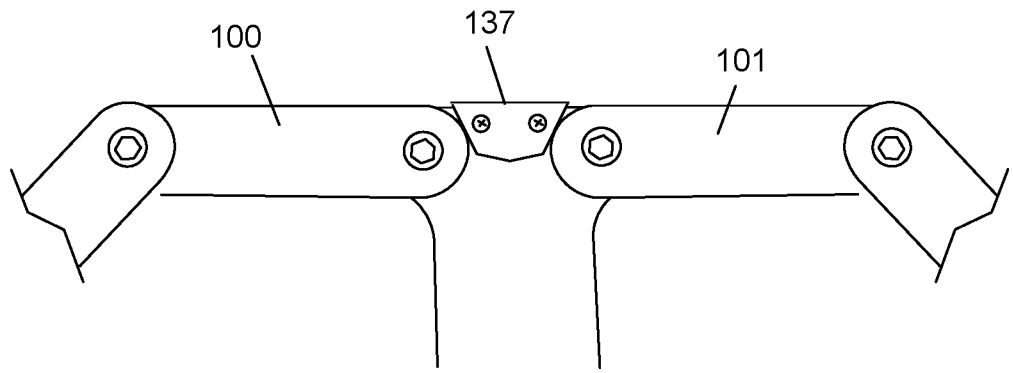
FIGS. 14-16 show the functionality of a preferred forward pivot arm motion stopping piece.
Figure 15:
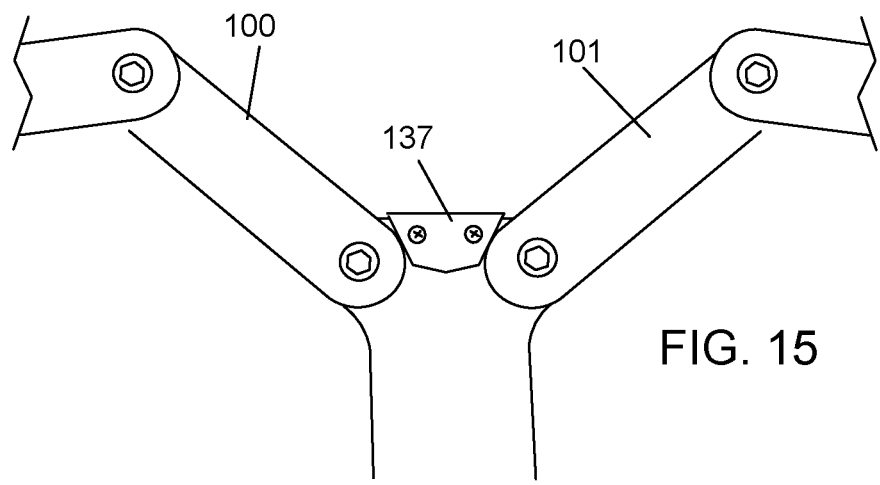
Figure 16:
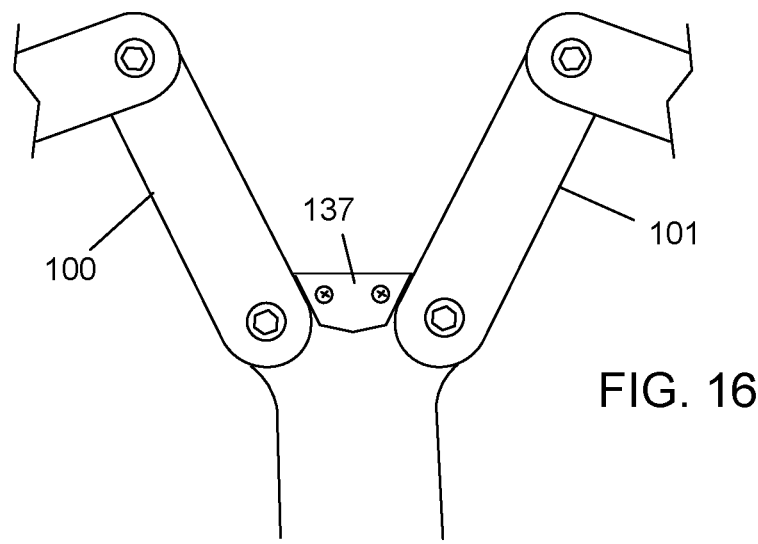

Motion stopping piece 137 (FIG. 1A) functions to prevent undesired clockwise pivot motion of pivot arm 100 and undesired counterclockwise pivot motion of pivot arm 101. For example, FIGS. 14-16 show the functionality of motion stopping piece 137. In FIG. 15, the user has rotated pivot arm 100 clockwise from the position shown in FIG. 14 and the user has rotated pivot arm 101 counterclockwise from the position shown in FIG. 14. In FIG. 16 the user has further rotated pivot arm 100 clockwise and pivot arm 101 counterclockwise. However, the pivoting motion of both pivot arms is stopped by contact with motion stopping piece 137. This prevents the mounted fishing rods from coming into contact with one another. For example, as shown in FIG. 10, motion stopping piece 137 restricts rods 301 and 302 from crossing each other when stored vertically.

Figure 9:
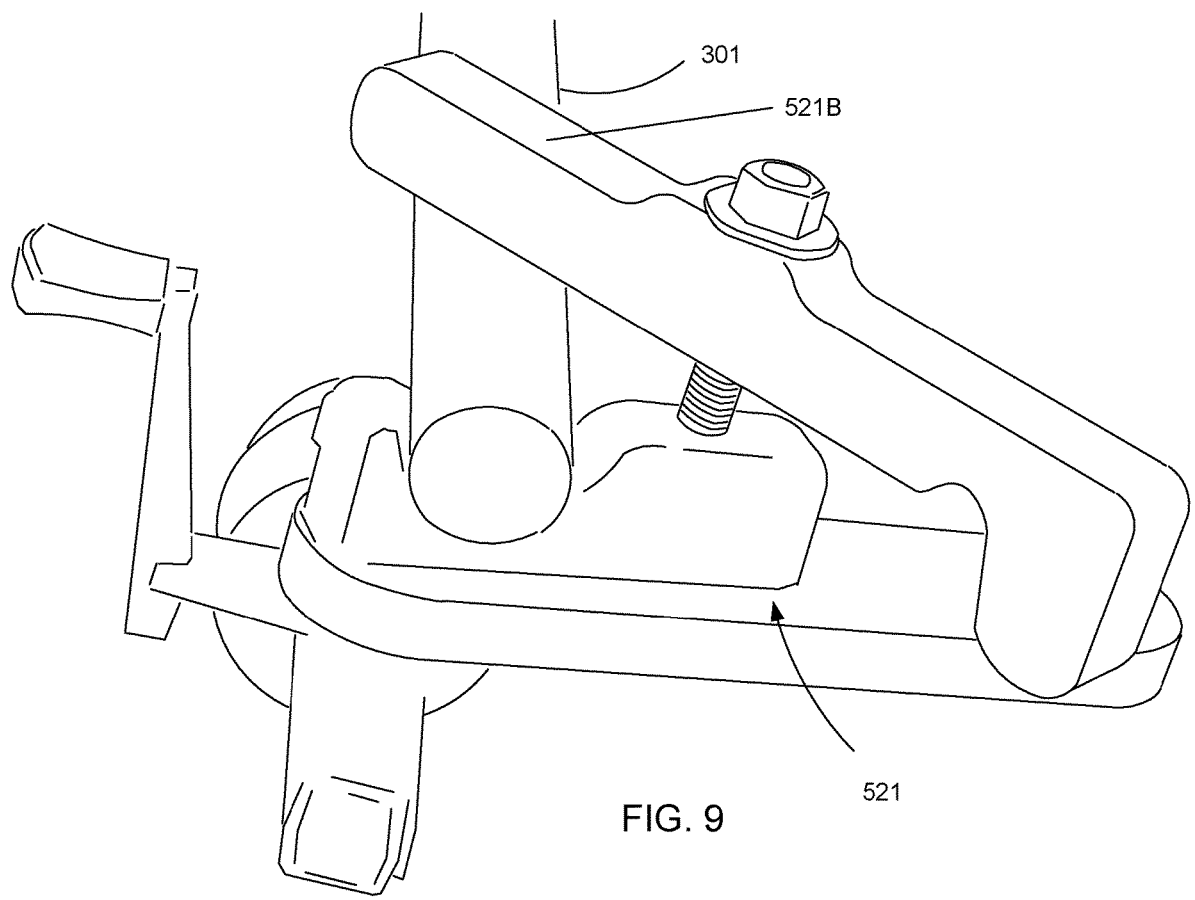

FIG. 9 shows another preferred embodiment of the present invention showing rear rod securing device 521. Rear rod securing device 521 is similar to rear rod securing device 122 discussed above. However, rear rod securing device 521 includes a longer compression arm 521B. Compression arm 521B allows for the compression of rod 301 higher up on the handle as shown. This is useful for fishing rods that have handles of larger diameter and is useful for fishermen who prefer to have the handle compressed higher up on the handle.

Figure 10:
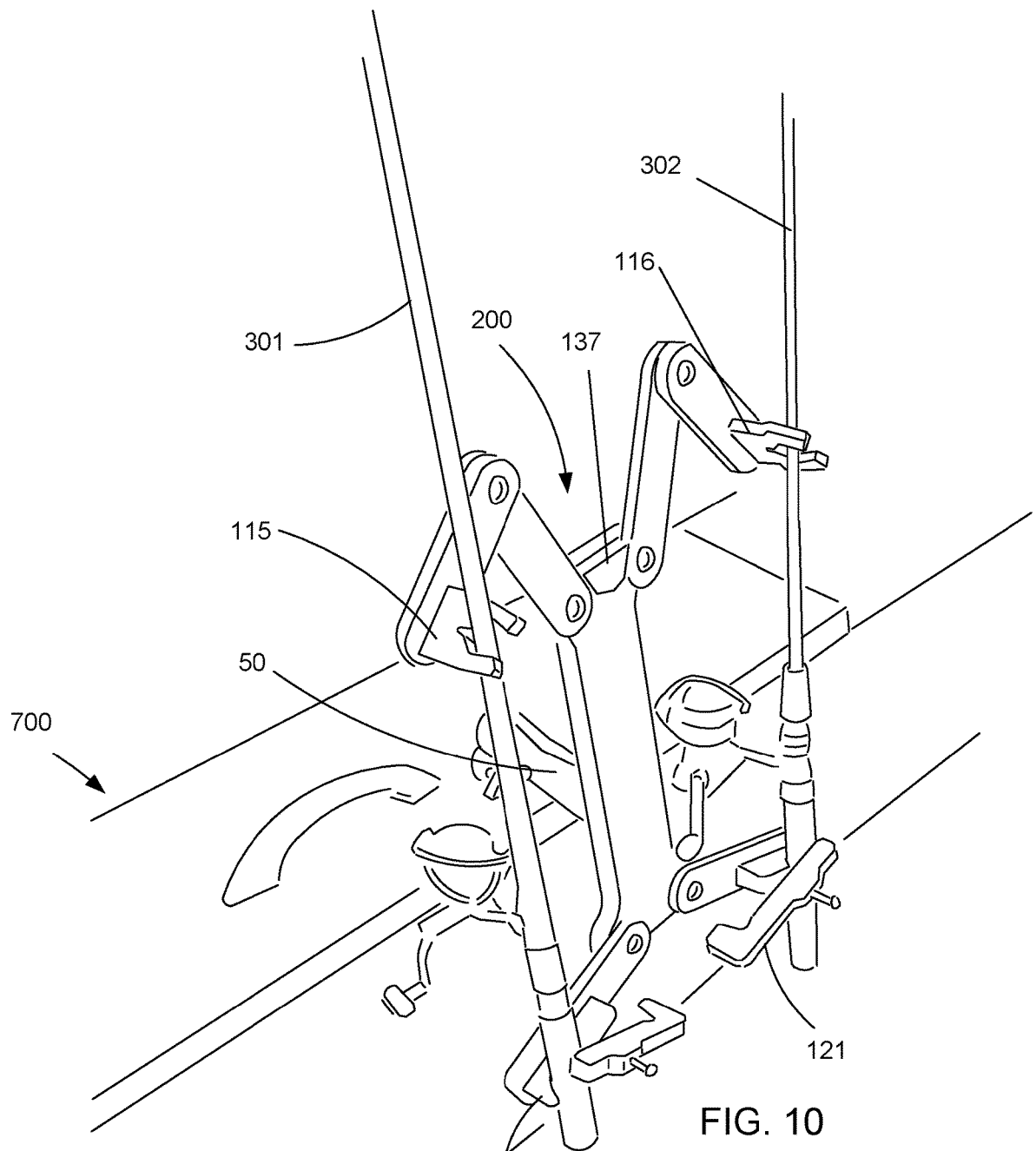

FIG. 10 shows a useful feature of the present invention. In FIG. 10, rod holder 200 is mounted onto fishing boat rail 700 via RAM® mount 50. Using mount 50, rod holder 200 has been tilted back so that rods 301 and 302 are approximately vertical. Rods 301 have been locked into place using rear rod securing devices 122 and 121 and forward rod supports 115 and 116. In this position, the fishing rods are well secured and out of the way of passengers and fishermen on the boat, increasing safety and enjoyment.

Figure 11:
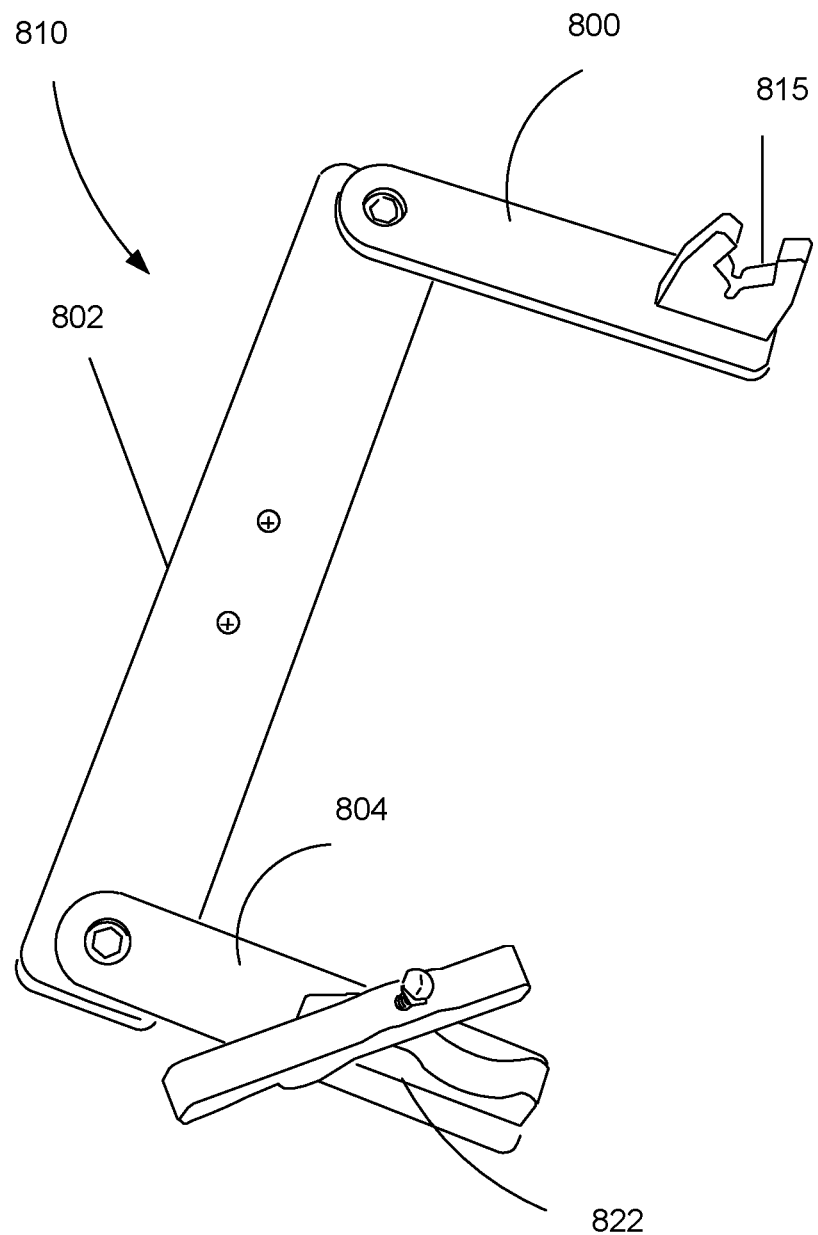
FIGS. 11-13 show another preferred embodiment of the present invention.
Figure 12:
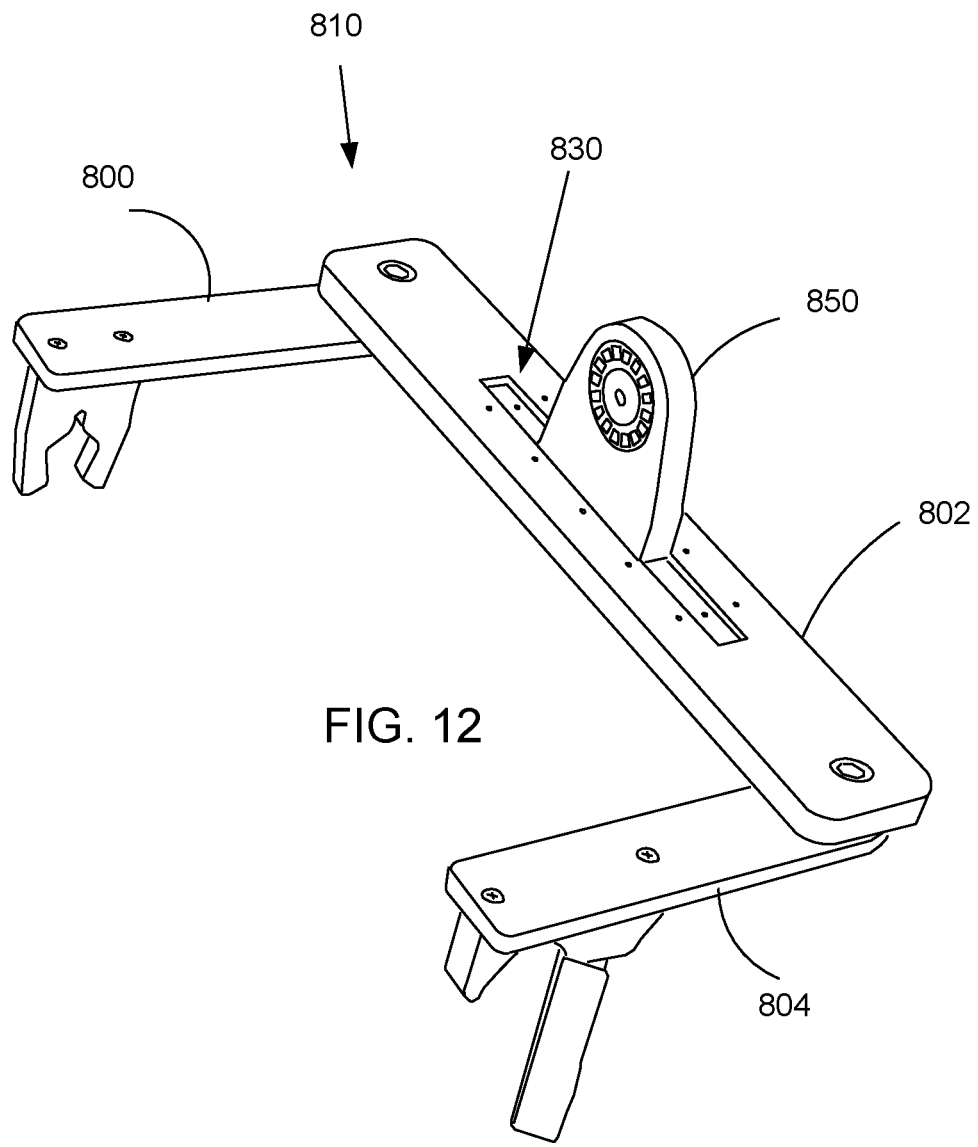
Figure 13:
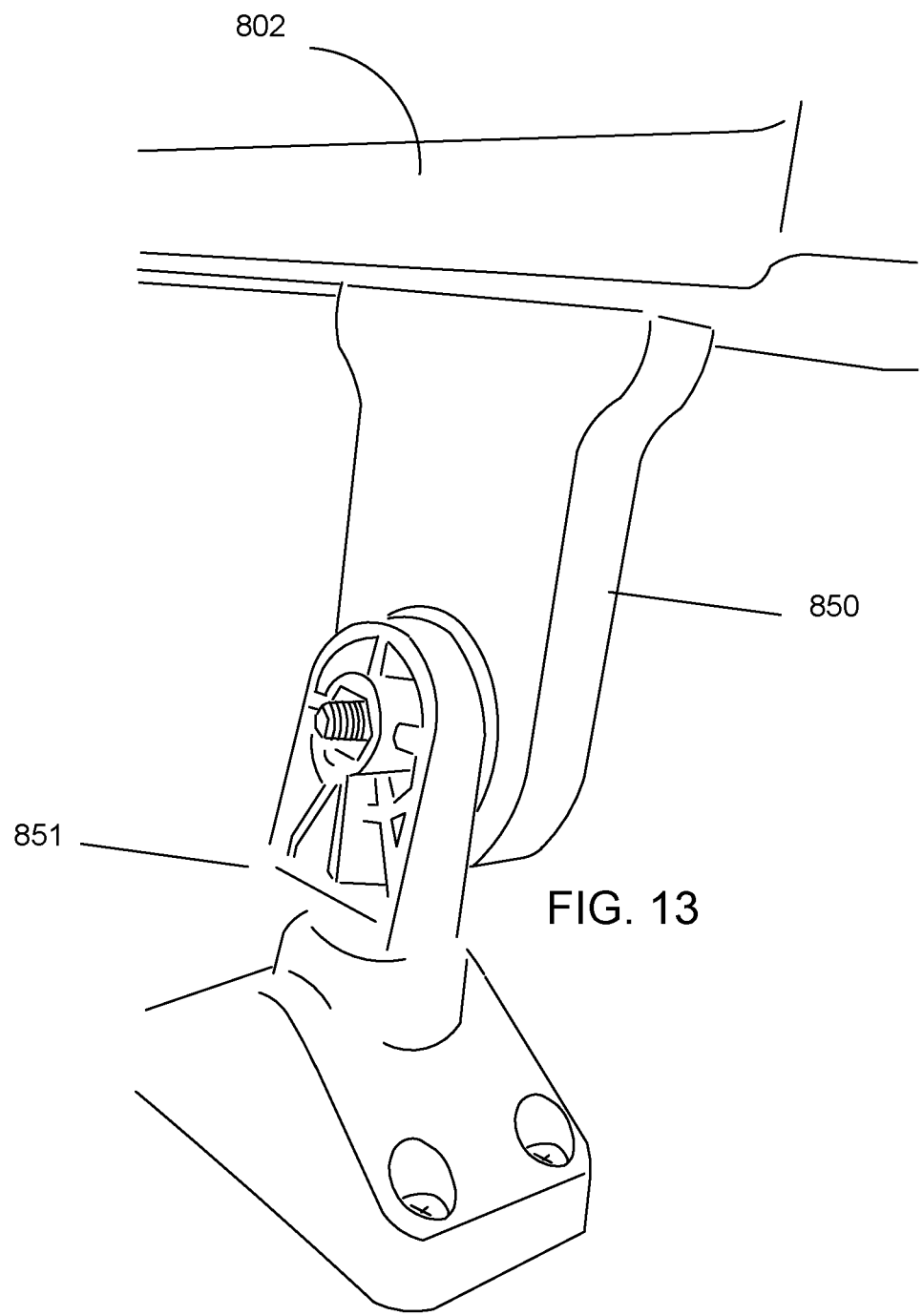

FIGS. 11-13 show another preferred embodiment of the present invention. In this embodiment, fishing rod holder 810 includes only one forward pivot arm 800 and one rear pivot arm 804 is utilized. This embodiment is useful for fishermen who only need a rod holder for just one fishing pole. This embodiment is also smaller and can save valuable space on a boat. In this preferred embodiment, forward pivot arm 800 and rear pivot arm 804 are both pivotally connected to base 802 and may be pivoted easily by a user. Forward rod support 815 is connected to forward pivot arm 800 and rear rod securing device 822 is connected to rear pivot arm 804.

Mount connector 850 is rigidly connected to mounting section 830 of base 802 (FIG. 12). In FIG. 13, mount connector 850 has been pivotally connected to mount 851 as shown.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A fishing rod holder for holding a fishing rod, comprising:
   A. a base comprising a mounting interface,
   B. at least one forward pivot arm pivotally connected to said base, wherein said at least one forward pivot arm is held in place via friction force between said at least one forward pivot arm and said base,
   C. at least one forward pivot arm bolt extending through said at least one forward pivot arm and said base,
   D. at least one forward pivot arm nut threaded onto said at least one forward pivot arm bolt, wherein said at least one forward pivot arm nut is tightened loosely enough to allow pivoting motion between said at least one forward pivot arm and said base, but tight enough so that said at least one pivot arm will remain in the proper position due to friction force,
   E. at least one rear pivot arm pivotally connected to said base, wherein said at least one rear pivot arm is held in place via friction force between said at least one rear pivot arm and said base,
   F. at least one rear pivot arm bolt extending through said at least one rear pivot arm and said base,
   G. at least one rear pivot arm nut threaded onto said at least one rear pivot arm bolt, wherein said at least one rear pivot arm nut is tightened loosely enough to allow pivoting motion between said at least one rear pivot arm and said base, but tight enough so that said at least one rear arm will remain in the proper position due to friction force,
   H. a forward rod support connected to each said at least one forward pivot arm, and
   I. a rear rod securing device connected to each said at least one rear pivot arm, wherein said fishing rod holder is mounted onto a boat or pier.

2. The fishing rod holder as in claim 1, wherein said at least one forward pivot arm is two forward pivot arms and said at least one rear pivot arm is two rear pivot arms.

3. The fishing rod holder as in claim 2, further comprising two forward inner pivot arms, each said inner pivot arm connected between said base and each said forward pivot arm, wherein said two forward inner pivot arms and said two forward pivot arms pivot in pivot planes parallel to each other.

4. The fishing rod holder as in claim 1, wherein said mounting interface comprises mounting holes drilled into said base and a mounting slot recessed into said base.

5. The fishing rod holder as in claim 1, wherein said forward rod support comprises:
   A. two vertical bent prongs,
   B. two locking indentions, each locking indention formed into each bent prong, and
   C. a fishing line travel slot to allow for the free travel of fishing line.

6. The fishing rod holder of claim 5, wherein only said two locking indentions are required to lock said fishing rod into place when said forward pivot arm is pivoted and said fishing rod is pinched between said two locking indentions.

7. The fishing rod holder as in claim 1, wherein said rear rod securing device comprises:
   A. a lower stationary arm rigidly connected to said at least one rear pivot arm,
   B. an upper pivot arm pivotally connected to said lower stationary arm,
   C. a handle receiving indention, wherein said fishing rod is compressed between said upper pivot arm and said lower stationary arm and rests in said handle receiving indention.

8. The fishing rod holder as in claim 1, further comprising a forward pivot arm motion stopping piece rigidly connected to said base, said forward pivot arm motion stopping piece for stopping undesired pivot motion of said at least one forward pivot arm.

9. The fishing rod holder as in claim 1, wherein said forward rod support is directly and rigidly connected to said at least one forward pivot arm without any intermediate connection pieces between said forward rod support and said at least one forward pivot arm.

10. The fishing rod holder as in claim 1, wherein said rear rod securing device is directly and rigidly connected to said at least one rear pivot arm without any intermediate connection pieces between said rear rod securing device and said at least one rear pivot arm.

11. A fishing rod holder for holding a fishing rod, comprising:
   A. a base comprising a mounting interface,
   B. at least one forward pivot arm pivotally connected to said base, wherein said at least one forward pivot arm is held in place via friction force between said at least one forward pivot arm and said base,
   C. at least one forward pivot arm bolt extending through said at least one forward pivot arm and said base,
   D. at least one forward pivot arm nut threaded onto said at least one forward pivot arm bolt, wherein said at least one forward pivot arm nut is tightened loosely enough to allow pivoting motion between said at least one forward pivot arm and said base, but tight enough so that said at least one pivot arm will remain in the proper position due to friction force,
   E. at least one rear pivot arm pivotally connected to said base, wherein said at least one rear pivot arm is held in place via friction force between said at least one rear pivot arm and said base,
   F. at least one rear pivot arm bolt extending through said at least one rear pivot arm and said base,
   G. at least one rear pivot arm nut threaded onto said at least one rear pivot arm bolt, wherein said at least one rear pivot arm nut is tightened loosely enough to allow pivoting motion between said at least one rear pivot arm and said base, but tight enough so that said at least one rear arm will remain in the proper position due to friction force,
   H. a forward rod support connected to each said at least one forward pivot arm, wherein said forward rod support comprises:
      i. two vertical bent prongs,
      ii. two locking indentions, each locking indention formed into each bent prong, and
      iii. a fishing line travel slot to allow for the free travel of fishing line, wherein only said two locking indentions are required to lock said fishing rod into place when said forward pivot arm is pivoted and said fishing rod is pinched between said two locking indentions, and
   I. a rear rod securing device connected to each said at least one rear pivot arm, said rear rod securing device comprising:
      i. a lower stationary arm rigidly connected to said at least one rear pivot arm,
      ii. an upper pivot arm pivotally connected to said lower stationary arm, and
      iii. a handle receiving indention, wherein said fishing rod is compressed between said upper pivot arm and said lower stationary arm and rests in said handle receiving indention.

\* \* \* \* \*